June 19, 1956 K. WAGNER 2,751,213
PRICE INDICATOR FOR FULLY AUTOMATIC INCLINATION SCALES
Filed Nov. 15, 1952
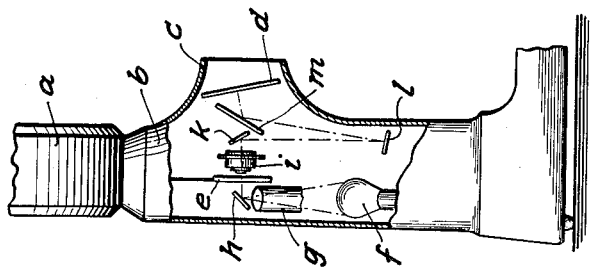
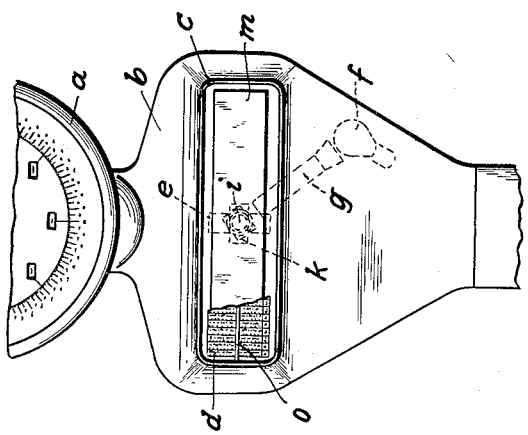
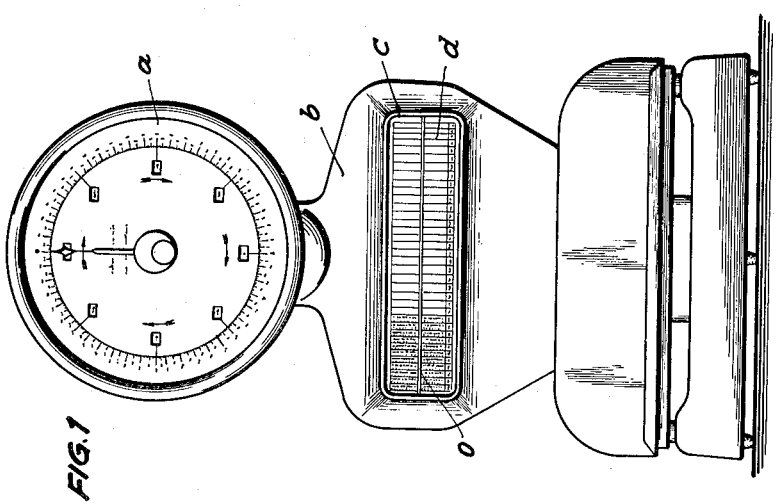
INVENTOR
KURT WAGNER

2,751,213

PRICE INDICATOR FOR FULLY AUTOMATIC INCLINATION SCALES

Kurt Wagner, Ebingen, Wurttemberg, Germany, assignor to August Sauter K. G., Ebingen, Germany, a firm Application November 15, 1952, Serial No. 320,648

Claims priority, application Germany November 17, 1951

2 Claims. (Cl. 265—29)

This invention relates to improvements in automatic scales.

The known semi-automatic inclination scales as extensively used in food stores possess besides a weight dial also a price table. This price table permits in a most simple manner to read off in addition to the weight also the price for the indicated weight up to 1 kilo. For weights of more than 1 kilo the extension of the price table, however, introduces difficulties. With change-over inclination scales it was possible to extend the price table in connection with the shifting mechanism to a range of two and three kilos. This extension, however, is obtained at the cost of a reduction of the number of price units which can be accommodated, i. e. if it was possible previously, to accommodate the prices in 33 different price units, this number was now reduced to one half or one third.

Further development on the fully automatic inclination scales has led to the construction of drum scales and of scales with rotating dials. Such latter types of scales have provided the possibility to accommodate in addition to the weight graduation on the drum or on the rotatable dial also the required number of price units permitting to read off the prices up to 10 kilos. However, these scales have the great disadvantage that owing to the high inertia of the mass given by the drums or dials which, of course, must have a certain size, it is not possible for reasons of stability and strength to go below a certain weight, even with the lightest construction so that these scales do not operate with the precision required today. A graduation of 20 gram intervals over a 10 kilo weight range is not up to the modern requirements of exactitude. In addition, magnifying devices such as lenses are necessary to read off the weights and prices, which renders reading off more difficult and tiresome in the long run.

A further group of the fully automatic inclination scales with price indication are the so-called luminous dial scales which permit reading off of the prices up to a maximum load of 10 kilos without having the drawbacks of the fully automatic drum scales or of the scales with rotatable dials as regards exactitude or reading off by means of lenses. These fully automatic luminous dial scales with price table have been sold in considerable quantities as they permit easy reading in spite of the considerable disadvantage that a sudden failure of the current supply will, in a store using luminous dial scales only, bring business to a standstill, as no weighing operations can be performed.

This invention obviates the above mentioned drawbacks and relates to a price indicator for fully automatic scales with a weight indicator revolving on a circular dial the prices of the weighed goods being projected onto a ground-glass plate and being read off therefrom.

One preferred embodiment of this invention will be hereinafter described with reference to the accompanying drawing, given merely by way of example, and in which:

Fig. 1 is a front elevation of fully automatic inclination scales according to the present invention;

Fig. 2 is a part of the front elevation of Fig. 1 with the ground-glass plate partially broken away showing the arrangement of the projection means of the price indicator;

Fig. 3 is a partial side view of the scales shown in Fig. 1, the lateral wall being broken away to show details of the price indicator.

The scales represented in the drawing have a weight indicating dial head ($a$) placed on a column ($b$) which encloses all construction elements of the price indicator without change in the usual construction of the scales. The column ($b$) has an aperture ($c$) behind which a substantially rectangular ground-glass plate ($d$) is arranged on the lower end of which the unit prices ($n$) are indicated in the form of a continuous horizontal row.

The ground-glass plate permits reading off the prices corresponding to the weight indicated up to a maximum load of the scales, e. g. 10 kilos for the unit price to be calculated in the particular case. In this way the advantages of the luminous dial scales are combined with those of the fully automatic pointer scales, without the danger that, when using the scales of the present invention, in the case of failure of the current supply all work will come to a standstill during the most busy hours. There is a particular advantage chiefly with scales with a multiple revolution of the pointer and having a small dial head, in that the aperture ($c$) is situated immediately below the dial head ($a$) at a very convenient reading height.

The projection of the prices for a plurality of weight units onto the ground-glass plate is effected in the following manner: a small graduated glass plate ($e$) carries the unit values (price units) corresponding to the different unit prices which are put down in parallel vertical columns and are to be magnified by projection onto the ground-glass plate ($d$). This glass plate ($e$) is conveniently connected to the rack serving to drive the axle of the weight pointer or with the mounting element of the rack or with the driving means of the dial head ($a$) executing the same uniform movement as the rack. This provides the advantage that no particular adjusting means are necessary for the graduated glass plate ($e$) and for the price table in order to provide conformity between the weight graduation and the price table. The incandescent lamp ($f$) projects its light by means of a condenser ($g$) and the mirror ($h$) through the graduated glass plate ($e$) and the objective ($i$) onto the mirrors ($k$), ($l$), ($m$) and finally onto the ground glass screen ($d$), so that on the latter the transparent price table moving up and down in a linear path together with the rack or the like is reproduced and the prices corresponding to the weight placed on the scales may be read off in the different price columns. The horizontal reading line is denoted with ($o$).

In the case of linear magnification of 1:20 there will be a luminous line of about 30 mm. of width over the entire length of the rectangular-shaped ground-glass plate. The transparent price table ($e$) is conveniently so small and light (of minimum mass) that it does not transmit to the differential gear of the weight pointer drive a load sufficient to impair the exact adjustment of the scales.

Owing to the fact that all constructional elements constituting the price indicator are accommodated within the column ($b$) it will be possible to convert already existing scales by means of a "construction set"-type of combination, e. g. by substituting a column with a price indicator according to the invention for the existing column and vice versa.

It can thus be seen, that there has been provided according to this invention a computing scale of the character described which has as prominent features circular-shaped, revolvable weight indicator means including a weight transmission mechanism therefor, and substantially rectangular-shaped price indicator means arranged below said weight indicator means and a computing scale comprising circular-shaped, revolvable weight indicator means including a transmission mechanism therefor, and substantially rectangular-shaped price indicator means including a ground-glass panel arranged below said weight indicator means and comprising a substantially transparent price table plate of minimum mass and displaceable in a linear path by said mechanism from which said plate depends, whereby said plate is displaced commensurate with the revolution of said weight indicator means, and light rays projector means disposed with respect to said price table plate in order to project from the latter prices of weighed goods onto said ground-glass panel for reading off said prices.

Having thus described the invention, what is claimed as new and desired to be secured by Letters Patent, is:

1. A computing scale comprising circular-shaped, revolvable weight indicator means including a transmission mechanism therefor, and substantially rectangular-shaped price indicator means including a ground-glass panel arranged below said weight indicator means and comprising a substantially transparent price table plate of minimum mass displaceable in a plane spaced from and substantially parallel and opposite to said ground-glass panel, said table plate being operatively connected to said mechanism from which said plate depends, whereby said plate is displaced commensurate with the revolution of said weight indicator means, and light rays projector means disposed with respect to said price table plate in order to project from the latter prices of weighed goods onto said ground-glass panel for reading off said prices.

2. A computing scale according to claim 1, including a column arranged below said circular-shaped weight indicator means, said column forming an enclosure for said ground-glass plate, said transparent price table plate, and said light rays projector means, whereby said column may be attached to said scale without otherwise altering the same.

References Cited in the file of this patent

UNITED STATES PATENTS

| | | |
|---|---|---|
| 1,166,658 | Buckingham | Jan. 4, 1916 |
| 1,251,148 | Wetzel | Dec. 25, 1917 |
| 1,437,517 | Hem | Dec. 5, 1922 |
| 1,619,121 | Hem | Mar. 1, 1927 |

FOREIGN PATENTS

| | | |
|---|---|---|
| 823,943 | France | Jan. 28, 1938 |